United States Patent [19]

Verleg et al.

[11] Patent Number: 5,286,832
[45] Date of Patent: Feb. 15, 1994

[54] PROCESS AND RESIN COMPOSITION FOR THE MANUFACTURE OF CAST, INJECTION MOULDED OR COMPRESSION MOULDED PIECES

[75] Inventors: Ronald L. Verleg, Weesp; Adrianus J. De Koning, Zwolle, both of Netherlands

[73] Assignee: Stamicarbon B.V.

[21] Appl. No.: 671,620

[22] Filed: Mar. 20, 1991

[30] Foreign Application Priority Data

Mar. 21, 1990 [NL] Netherlands ............... 9000659

[51] Int. Cl.$^5$ ............ C08G 18/34; C08G 18/68; C08F 20/06
[52] U.S. Cl. ............ 528/75; 528/76; 528/77; 525/28; 525/440; 525/444; 525/445; 525/455; 525/920
[58] Field of Search ....... 528/75, 76, 77, 28, 528/440, 444, 445, 455, 920

[56] References Cited

U.S. PATENT DOCUMENTS

| | | | |
|---|---|---|---|
| 3,373,221 | 11/1964 | May | 528/80 |
| 3,879,494 | 4/1975 | Mikovich et al. | 525/77 |
| 3,886,229 | 5/1975 | Hutchinson et al. | 528/76 |
| 4,280,979 | 7/1981 | Dunleavy et al. | 528/75 |
| 4,284,684 | 9/1981 | Kallaur | 525/920 |
| 4,289,684 | 4/1980 | Kallaur | 525/28 |
| 4,374,229 | 11/1981 | Diennavant et al. | 528/73 |
| 4,374,238 | 2/1983 | Shanoski | 528/59 |
| 4,434,576 | 3/1984 | O'Connor et al. | 528/75 |

FOREIGN PATENT DOCUMENTS

0127181 12/1984 European Pat. Off. .
2533846 3/1976 Japan .

*Primary Examiner*—Maurice J. Welsh
*Assistant Examiner*—John M. Cooney, Jr.
*Attorney, Agent, or Firm*—Cushman, Darby & Cushman

[57] ABSTRACT

The present invention relates to a process for the manufacture of a cast, injection moulded or compression moulded articles by curing a resin composition in a desired shape using catalysts, and allowing the shaped piece to post-cure under such conditions that an HDT of at least 150° C. is obtained. The resin composition comprises a polyisocyanate, an ethylenically unsaturated monomer and a vinyl ester compound, and the vinyl ester compound contains on average about two to about 6 (meth)acrylate groups and on average about two to about 6 hydroxyl groups, and has a molecular weight higher than 300. The invention also relates to a resin composition suitable for use in the process.

14 Claims, No Drawings

PROCESS AND RESIN COMPOSITION FOR THE MANUFACTURE OF CAST, INJECTION MOULDED OR COMPRESSION MOULDED PIECES

The present invention relates to a process for the manufacture of a cast, injection moulded or compression moulded article by catalytically curing a resin composition in a desired shape. The resin composition used in the present process comprises an ethylenically unsaturated monomer, a polyisocyanate and a vinyl ester compound.

The present invention also relates to a resin composition suitable for use in this process.

U.S. Pat. No. 4287116 describes a process and a resin composition, wherein the resin composition comprises a vinyl ester urethane, an unsaturated monomer, an isocyanate and a polyol. A thickening effect is obtained in this patent from the reaction of the isocyanate with the polyol (this forming polyurethane). This cured composition is later cured by radical polymerization. A drawback of the products obtained from this process is that the heat deflection temperature (HDT) of the resulting matrix, measured according to ASTM-D-648-72, is not higher than 100°-120° C.

The HDT is the temperature at which a bar of rigid material deflects by a specific amount when subjected to a bending stress under a three-point load. Normally a material can not be used above its HDT, because at those higher temperatures the material loses its strength and stiffness. Therefor materials with a high HDT are advantageously used in applications where high temperatures can occur.

The heat deflection temperatures of conventional cured polyester/urethane hybrids are known from "High Performance urethane modified Unsaturated Polyesters", by Edwards H.R., paper 10, BPF Brighton Conference, pp. 37-45 (1982). These HDT values are insufficient for certain applications, such as in automative, where certain parts are in close contact with hot engine parts, or as in aerospace. However, conventional/polyester urethane hybrids do possess good corrosion resistance and impact resistance.

BRIEF DESCRIPTION OF THE PRESENT INVENTION

The object of the present invention is to provide molded resin articles that combine good mechanical properties, such as impact resistance, with a higher HDT.

This is achieved in the present invention by using a process for the manufacture of a cast, injection moulded or compression moulded article in which a resin composition is allowed to catalytically cure in a desired shape and then allowing the shaped piece to cure under such conditions which will produce an HDT of at least 150° C. The resin composition of the present invention comprises a polyisocyanate, an ethylenically unsaturated monomer and a vinyl ester compound. The vinyl ester compound contains on average about two to about 6 (meth)acrylate groups and on average about two to about 6 hydroxyl groups. The vinyl ester compound has a molecular weight greater than 300.

DETAILED DESCRIPTION OF THE PREFERRED EMBODIMENT

The present invention relates to a process for the manufacture of a cast, injection molded or compression molded article by catalytically curing a resin composition in a desired shape, and then subjecting the shaped article to post-cure conditions to provide an article with good mechanical properties and a high HDT. The resin composition used in this process comprises a polyisocyanate, an ethylenically unsaturated monomer and a vinyl ester compound. The vinyl ester compound contains about 2 to about 6 hydroxyl groups and about 2 to about 6 (meth)acrylate groups, and has a molecular weight of greater than 300.

The present invention also relates to a resin composition comprising a polyisocyanate, an ethylenically unsaturated monomer and a vinyl ester compound, where the vinyl ester compound has a molecular weight greater than 300 and contains about two to about 6 (meth)acrylate groups and about two to about 6 hydroxyl groups. The vinyl ester compound of the present invention excludes ketoxime blocked isocyanates.

When the term molecular weight is used in the present application it is referring to the number average molecular weight.

It is very surprising that a vinyl ester compound containing hydroxyl groups makes it possible to cure or post-cure a product containing polyisocyanate in order to provide an HDT that is substantially higher than 100°-1200° C., with preservation in the resin of good mechanical properties. It had been expected that increasing the crosslink density would result in a resin with considerable brittleness (and thus lower impact resistance and/or elongation at break).

In U.S. Pat. No. 4.289.684 a composition is described containing a vinyl ester with hydroxyl groups and a polyisocyanate. This composition however is only used to thicken a compound consisting of unsaturated polyester and fibrous reinforcements. Post-curing to obtain a high HDT is not described.

JP-A-58-89611 describes a coating composition on the basis of a ketoxime blocked isocyanate, a polyol and a compound containing acrylate groups. The polyol may contain the acrylate groups, and an unsaturated monomer may be added. According to this publication, the ketoxime reacts with the acrylate groups during the curing process. It is said that because of this, the oxime does not cause formation of gas bubbles. Use of the resin composition in castings is mentioned as a possibility, but no indication is given that a high HDT is obtained in post-curing.

According to the present invention, it appears to be possible to cure a product under such conditions which produce an HDT of greater than 170° C. or even greater than 200° C. In practice it is advantageous first to allow a cast, injection moulded or compression moulded article to cure at a temperature lower than 100° C. and subsequently allow the shaped product to post-cure for an appropriate time and at an appropriate temperature to provide the desired HDT.

The post-curing time of the hybrids according to the invention is short, compared with other resins with an high HDT, such as e.g. BMI. In general a period of two hours at a high temperature will be enough. The material will then obtain the HDT that "belongs" to this temperature.

Preferably the post-cure is divided into several stages with an increasing temperature, with e.g. steps of 40°-50° C. The necessary curing time and temperature depend also of the applied processing temperature and of the catalyst system applied. These ranges can be determined by an expert by simply applying several curing cycles at a specific system and measuring the HDT.

The vinyl ester compound preferably has a molecular weight higher than 400, but lower than 5000, in particular lower than 3000. A particularly preferred molecular weight range is 400 to 2000. This weight range provides relatively large quantities of (meth)acrylate and hydroxy groups; The numbers of these functional groups ultimately determine the crosslink density of the resin composition. If more than on average two (meth)acrylate and hydroxyl groups per vinyl ester compound are present, there is no problem with increasing the molecular weight proportionately.

By preference the vinyl ester contains at least about two groups of formula I:

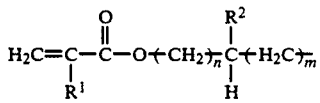

(I)

where:
$R^1$ is H or methyl,
n, m - 0 or 1, and n+m = 1 or 2;
if n+m = 1 then $R^2$ = $CH_2$—OH;
if n+m = 2 then $R^2$ = OH.

A vinyl ester compound which possesses these groups is relatively simple to prepare and gives very good results in the present invention.

Preferably, the vinyl ester compound has an acid number less than 20, more preferably less than 10. A low acid number is advantageous because carboxylic acid groups can react with isocyanate groups, which releases $CO_2$ gas.

The vinyl ester compound is preferably based on a polyester, polyether, polyamide or polyurethane. Particularly preferred vinyl ester compounds are polyethers and polyesters.

Suitable polyethers include bisphenols. Particularly preferred polyethers are bisphenol-A based polyols, such as bisphenol-A, alkoxylated bisphenol-A, and oligomers of bisphenol-A. The bisphenol-A based compounds show good corrosion resistance. This provides an end product with an HDT in excess of 150° C. combined with good impact resistance and good corrosion resistance. Another suitable polyether is a phenol formaldehyde novolak resin.

Suitable polyesters for use in the present invention include saturated and unsaturated polyesters. These polyesters are prepared substantially from dicarboxylic acids and dialcohols.

Examples of unsaturated dicarboxylic acids include maleic acid, fumaric acid, citraconic acid or itaconic acid. Examples of saturated dicarboxylic acids include malonic acid, succinic acid, glutaric acid, adipic acid, sebacic acid, tetrahydrophthalic acid, hexachloroendomethylenetetrahydrophthalic acid, dichlorophthalic acid, isophthalic acid, terephthalic acid or phthalic acid anhydride. In addition, combinations of various acids can be used. The preferred unsaturated dicarboxylic acids are maleic acid anhydride and fumaric acid.

The carboxylic acid is generally esterified with a diol, but it is also possible to use a small amount of a monoalcohol or a triol or tetraol.

Suitable alcohols include one or more aliphatic and/or cycloaliphatic mono-, di- and/or polyvalent alcohols, such as: benzyl alcohol, ethylene glycol, propylene glycol, butane diol, hexane diol, cyclohexane dimethanol, hydrogenated bisphenol-A, diethylene glycol, glycerol, trimethylol propane, pentaerythritol or dipentaerythritol. In addition to, or in place of the alcohol compound(s), one or more epoxy compounds can be used. These include ethylene oxide, propylene oxide and allylglycidyl ether.

In addition, it is possible to use as the alcohol an alkoxylated bisphenol, such as ethoxylated or propoxylated bisphenol-A. An alkoxylated bisphenol is a compound of formula II, in which $R^1$ and $R^2$ are selected from hydrogen atoms and hydrocarbon groups. The hydrocarbon groups are preferably alkyl groups, most preferably methyl groups.

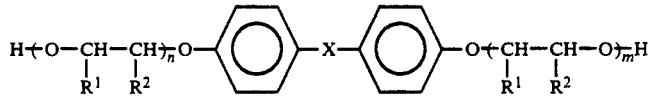

(II)

The value of n+m is normally less than 12 for the present invention. Preferably, n and m are both approximately 1 on average. x represents —$CH_2$—, —$C(CH_3)_2$—, —$SO_2$— or —O—. If desired, one or both of the aromatic groups in the diol of formula II can be fully saturated.

As polyamides, known polyamides can be used, for example nylon 4,6, nylon 6,6, nylon 6 and nylon 12. Suitable polyurethanes include: the reaction products of polyisocyanates with polyols and polyamines, where the polyols and polyamines have a molecular weight between 60 and 400.

The polyester, polyether, polyamide or polyurethane described above are together referred to as 'prepolymer' in the present specification.

The vinyl ester compound consists of the prepolymer with on average about 2 to about 6 hydroxyl groups and on average about 2 to about 6 (meth)acrylate groups. The number of hydroxyl groups and the number of (meth)acrylate groups per vinyl ester compound are independent of each other. For each group the number of groups preferably is between 1.6 and 5, and more preferably between 1.8 and 3.2.

The exact process by which those groups are produced is not relevant to the present invention, provided the vinyl ester compound possesses the desired groups.

A desired vinyl ester compound can be obtained, for example, by reacting an epoxy group containing prepolymer with (meth)acrylic acid. It is also possible to react a glycidyl (meth)acrylate with an amine or acid functional group containing prepolymer. Another possibility is a reaction of glycidyl (meth)acrylate with a hydroxyl group, for example, the slightly acidic hydroxyl group of bisphenol-A. It is also possible, however, to react hydroxyalkyl (meth)acrylates with an equimolar quantity of di-isocyanate, and subsequently react 2 moles of this reaction product with 1 moles of a compound with an average of four hydroxyl groups.

The unsaturated monomer can be chosen from the group of monomers which can react with the ethylenic unsaturation of the vinyl ester. These groups include vinyl esters, vinyl aromatic compounds, acrylates, methacrylates, vinyl ethers and vinyl nitriles. Examples include styrene, α-methyl styrene, p-methyl styrene, vinyl toluene and acrylic acid or methacrylic acid (hydroxy) esters of alcohols with 1 to 12 carbon atoms. A preferred unsaturated monomer is styrene. Also suitable for use in the present invention are mixtures of monomers, in particular mixtures of styrene and other monomers. If a (meth)acrylic acid ester of a dialcohol is used, reaction of this group with an isocyanate can give extra crosslinking, which can have a beneficial effect on the properties of the end product. It is also possible to use polyfunctional monomers in the present invention. These include divinyl benzene, diallyl phthalate or triallyl cyanurate.

The polyisocyanate compound used in the present invention contains at least 1.75 isocyanate groups per molecule on average, and preferably 2 to 3 isocyanate groups per molecule. More preferably, the average functionality is 2.2 to 2.7 isocyanate groups per molecule. The polyisocyanate can include an aliphatic, an aromatic or a cycloaliphatic polyisocyanate or a combination of two or more different types. Examples of these include: toluene diisocyanates, 1,5-naphthalene diisocyanate, cumene-2,4-diisocyanate, 4-methoxy-1,3-phenylene diisocyanate, 4-chloro-1,3-phenylene diisocyanate, 4-bromo-1,3-phenylene diisocyanate, 4-ethoxy-1,3-phenylene diisocyanate, 2,4'-diisocyanato diphenyl ether, 5,6-dimethyl-1,3-phenylene diisocyanate, 2,4-dimethyl-1,3-phenylene diisocyanate, 4,4'-diisocyanate diphenyl ether benzidine diisocyanate, 4,6-dimethyl-1,3-phenylene diisocyanate, durene diisocyanate, 4,4'-diisocyanate dibenzyl, 3,3'-dimethyl-4,4'-diisocyanate diphenyl, 2,4-diisocyanate stilbene, 3,31-dimethoxy-4,41-diisocyanate phenyl methane, 3,3'-dimethoxy-4,4'-diisocyanate diphenyl, 1,4-anthracene diisocyanate, 2,5-fluorene diisocyanate, 1,8-naphthalene diisocyanate, 2,6-diisocyanato benzofuran amyl benzene-2,4-diisocyanate, hexyl benzene-2,4-diisocyanate, dodecyl benzene-2,4-diisocyanate, butyl benzene-2,4-diisocyanate.

A preferred polyisocyanate is carbodiimide modified diphenyl methane 4,4'-diisocyanate.

The ratio between the number of isocyanate groups and the number of hydroxyl groups (NCO/OH) generally is at least 0.7, and should be at most 1.6 (mole/mole). It is possible to add more isocyanate groups, but this may affect the mechanical properties of articles made from the resin composition.

Preferably the ratio of the number of isocyanate groups to the number of hydroxyl groups is in the range 0.8–1.3 (mole/mole).

The resin composition generally contains between 10 and 400 parts by wt. of monomer and between 100 and 350 parts by wt. of vinyl ester compound per 100 parts by wt. of polyisocyanate. Preferably, 50–200 parts by wt. of monomer and 150–300 parts by wt. of vinyl ester compound are used per 100 parts by wt. of poly-isocyanate.

Normally, the mixture of the present invention contains catalysts which promote the copolymerization of the unsaturated monomer with the unsaturated prepolymer. These catalysts can include the same systems which are used for normal unsaturated polyesters. In the case of RIM system applications, gas formation is a problem, which is the reason why peroxide catalysts containing moisture are less desirable in these systems. Examples of radical developing substances include peroxides, such as hydroperoxides, ketone peroxides, and peresters, for example benzoyl peroxide, ditertiary butyl peroxide, cyclohexanone peroxide, tertiary butyl perbenzoate and tertiary butyl peroctate, as well as photo initiators which are sensitive to visible or ultraviolet light.

The quantity of catalyst is usually in the range 0.5 to 5 wt. %, relative to the unsaturated components. In addition, an accelerator may be present, for instance, a cobalt compound or an amine.

Further, the composition may contain catalysts for the urethane reaction. If both catalyst systems are used, the gelation can take place very rapidly, so that short cycle times can be used in production.

The resin composition of the present invention may contain fibre-shaped reinforcements which improve the mechanical properties of objects which are made from it. In general, it is possible to add fibrous material from 5 to 75 wt. % material relative to resin composition and fibers.

Suitable fibrous materials include glass, asbestos, carbon and organic fibre materials, such as aromatic polyamides. Glass fibres can be present in any suitable form, including the form of a mat, tape or strip, in the form of continuous fibres or chopped staple fibres. Continuous fibres used as reinforcing material may form an arbitrary structure or be worked up in a fabric.

The resin composition of the present invention is suitable for use in RIM (Reaction Injection Moulding), RTM (Resin Transfer Moulding) and other closed mould techniques. The resin composition can also be processed in compression moulding methods and is suitable for use as a casting resin and as a resin for pultrusion and winding techniques.

When the resin mixture of the present invention is used in RIM or RTM, the fibrous reinforcement can be added to the mixture to be injected provided that the fibres are short enough. It is also possible to apply the fibrous structure to the mould before injection.

The composition may also contain other admixtures, such as pigments, stabilizers, for instance, antioxidants and UV stabilizers, and fillers such as talcum, mica, calcium carbonate, aluminum or carbon black.

In general the products of the present invention will be handled in a so-called two-part system (two-component system), where the first part contains the vinyl ester compound and (all or part of) the ethylenically unsaturated monomer, and the second part contains the isocyanate (and the rest of the ethylenically unsaturated monomer, where applicable). The catalysts and/or initiators are divided over these parts by a method known to one skilled in the art.

The curing mostly takes place at elevated temperature, although curing at room temperature is also effective. Preferably, the resin composition is processed above 50° C. and cured at a temperature between 50° and 100° C. In order to obtain a high HDT the product will subsequently have to be post-cured. The post-curing is generally effected by heating the product for at least some hours up to some days at temperatures between 120° and 250° C., preferably between 150° and 210° C. A major advantage of the process according to the present invention is that after a relatively short time at that temperature, a significant increase of the HDT is obtained.

The resin composition according to the present invention may also be cured, for example, if the composition is used in sheet or bulk moulding compounds, by first having the isocyanate reaction take place, which has a thickening effect, and then the radical polymerization at a temperature of 130°–200° C. and at elevated pressure.

The resin composition and the process according to the present invention can be applied, for example in the manufacture of pipes for desulphurization installations and in the manufacture of parts in automotive or aerospace.

The invention will be elucidated by the following examples and comparative experiments, without being restricted thereto.

The mechanical properties were determined as follows: tensile strength, elongation at break and E modulus according to DIN 53455, flexural strength and E modulus according to DIN 53452, impact strength according to DIN 53453, HDT according to ASTM-D-648-72 (the stress level applied is 1.8 MPa (264 tbf/m$^2$); the rate of heating was $2+0.2°$ C./min; the sample was immersed in mineral oil or silicon oil) and Barcol hardness according to ASTM-D2583. The acid number was determined according to DIN 53402. The hydroxyl number was determined according to DIN 53240. The viscosity was determined according to DIN 53019.

EXAMPLE I

Synthesis of Vinyl Ester 380 g (1 mole) diglycidyl ether of bisphenol-A and 0.152 g (400 ppm) hydrochinone were introduced into a 1-liter reactor equipped with a stirrer, a gas inlet tube and a thermocouple. The mixture was heated to 115° C. At this temperature 172 g (2 mole) methacrylic acid, in which 0.95 g (2500 ppm) chromium trichloride had been dissolved, was added to the mixture. The reaction was continued until the acid number was lower than 1. The reaction product was cooled and dissolved in 236 g styrene. The solution obtained had a solids content of 70%, an acid number of 0.8 mg KOH/g, a viscosity (at 23° C.) of 100 mPas and a calculated hydroxyl number of 147 mg KOH/g.

EXAMPLE II

Synthesis of Methacrylate Terminated Unsaturated Polyester 415 g (2.5 mole) isophthalic acid, 520 g (5 mole) neopentyl glycol and 490 g (5 mole) malei c anhydride were introduced into a 3-liter reactor equipped with a stirrer, a nitrogen gas inlet tube and a thermocouple. The mixture was heated to 210° C. At this temperature a condensation reaction was carried out until an acid number of 197 mg KOH/g was reached. The reaction product was cooled and dissolved in 950 g styrene. 197 g styrene, 204 g (1.44 mole) glycidyl methacrylate, 0.8 g toluchinone and 1.1 g chromium trichloride were added to 410 g of the solution obtained. This mixture was heated to 115° C. The reaction was continued until the acid number was lower than 1.

The solution obtained had a solids content of 75%, an acid number of 0.9 mg KOH/g and a hydroxyl number of 102 mg KOH/g.

EXAMPLE III

Manufacture of Test Plates for determination of the Mechanical Properties

A test plate was made as follows from the solution of example I. 8 g benzyl peroxide (50%) was dissolved as radical initiator in 400 g of the resin solution obtained. Next, the mixture was deaerated. Subsequently, 0.8 g diethyl aniline as accelerator, 164 g carbodiimide modified methylene-4,4'-diphenyl diisocyanate with a functionality of 2,3 (MDI) and 0.01 g dibutyl indiacetate as urethane catalyst were added. The mixture was poured between two flat chromed metal plates, measuring 20×40×4 mm. Conventionally, the plate was cured for 20 hours at room temperature. The plate was post-cured for 4 hours at 40° C. and 4 hours at 80° C. Next, test bars were cut and post-cured according to the invention for 4 hours at 120° C., 4 hours at 160° and 4 hours at 200° C. The mechanical properties and the HDT of these bars were determined. The results of these tests are presented in table 1.

TABLE 1

| Results of the mechanical property measurements in example III | |
|---|---|
| Tensile strength (MPa) | 75 |
| Elongation at break (%) | 2.9 |
| E modulus (GPa) (tensile test) | 3.4 |
| Flexural strength (MPa) | 144 |
| E modulus (GPa) (bending test) | 3.4 |
| Impact strength (kJ/m$^2$) | 15 |
| Barcol hardness | 46 |
| HDT (°C.) | 203 |

COMPARATIVE EXPERIMENT A

The procedure of example III was repeated with the solution of example I. However, no MDI was added to the mixture and another curing system was used: 8.0 g cumene hydroperoxide and 1.2 g cobalt 6%. Moreover, another curing cycle was applied: 3 hours at 110° C. and 1 hour at 150° C. The results are presented in table 2.

TABLE 2

| Results of the mechanical property measurements in Comparative experiment A | |
|---|---|
| Tensile strength (MPa) | 82 |
| Elongation at break (% | 3.2 |
| E modulus (GPa) (tensile test) | 3.9 |
| Flexural strength (MPa) | 147 |
| E modulus (GPa) (bending test) | 3.5 |
| Impact strength (kJ/m$^2$) | 13 |
| Barcol hardness | 45 |
| HDT (°C.) | 120 |

EXAMPLE IV

The purpose of example IV was to examine the effect of the hydroxyl groups in the vinyl ester by using in comparative experiments B and C a vinyl ester compound which did not contain hydroxyl groups. In example IV the procedure of example III was repeated with the resin of example I. However, only the HDT of the cured product was determined. The test bars for the HDT measurement were cured for 3 hours at 100° C. and 1 hour at 150° C. A second series of test bars were given an extra post-cure for 1 hour at 200° C. The results of these tests are presented in table 3.

COMPARATIVE EXPERIMENT B

The procedure of example III was repeated with 350 g of a 70% solution of the dimethacrylate ester of ethoxylated bisphenol-A in styrene, 127 g MDI, 7 g benzoyl peroxide (50%), 0.7 g diethyl aniline and 8.75 mg dibutyl tindiacetate. The post-curing cycle of example IV was applied. The results are given in table 3.

COMPARATIVE EXPERIMENT C

The procedure of example III was repeated with the solution of example I. However, no MDI and urethane catalyst were added to the mixture. The post-curing cycle of example IV was applied. The results are given in table 3.

TABLE 3

Results of the measurements of the mechanical properties in example IV and comparative experiments B and C

| | Ex. IV | Compar. exp. B | Compar. exp. C |
|---|---|---|---|
| HDT (1) (°C.) | 177 | 70 | 120 |
| HDT (2) (°C.) | 212 | —(3) | 128 |

(1) Post-curing cycle: 3 hours 100° C. and 1 hour 150° C.
(2) Post-curing cycle: 3 hours 100° C., 1 hour 150° C. and 1 hour 200° C.
(3) After the second post-curing cycle, gas bubbles had appeared in the test bars.

EXAMPLE V

The effect of an unsaturated polyester as vinyl ester compound was examined using the solution of Example II. The procedure of example III was repeated with 350 g of the solution of example II, 68 g MDI, 5 g benzoyl peroxide (50%), 0.16 g dimethyl aniline and 0.08 g dibutyl tindiacetate. The test plate was cured for 4 hours at 40° C., 4 hours at 80° C., 4 hours at 120° C., 4 hours at 160° C. and 10 minutes at 200° C. The results are given in table 4. A series of HDT test bars were given an extra post-curing for 3 hours at 200° C.

COMPARATIVE EXPERIMENT D

The procedure of example V was repeated without using MDI and urethane catalyst. The results are given in table 4.

TABLE 4

Results of the measurements of the mechanical properties in example V and comparative experiment D

| | Example V | Comp. exp. D |
|---|---|---|
| HDT (1) (°C.) | 147 | 120 |
| Tensile strength (MPa) | 76 | 79 |
| Elongation at break (%) | 2.9 | 3.1 |
| E modulus (GPa) (tensile test) | 3600 | 3900 |
| Flexural strength (MPa) | 152 | 125 |
| E modulus (GPa) (bending test) | 3300 | 3500 |
| Impact strength (kJ/m$^2$) | 20 | — |
| Barcol hardness | 50 | 50 |
| HDT (2) (°C.) | 167 | 135 |

(1) Post-curing cycle: 4 hours 40° C., 4 hours 80° C., 4 hours 120° C., 4 hours 160° C. and 10 min. 200° C.
(2) Post-curing cycle: 4 hours 40° C., 4 hours 80° C., 4 hours 120° C., 4 hours 160° C. and 3 hours 200° C.

EXAMPLE VIA, B AND C

The effect of a urethane catalyst on the mechanical properties of the cured product was examine using the solution from Example I. The procedure of example 3 was repeated, adding a) 0 g, b) 0.01 g (25 ppm) or c) 0.06 g (150 ppm) dibutyl tindiacetate. The results are given in table 5.

TABLE 5

The effect of the urethane catalyst on the mechanical properties

| | Example | | |
|---|---|---|---|
| | VIa | VIb | VIc |
| Tensile strength (MPa) | 68 | 69 | 69 |
| Elongation at break (%) | 2.4 | 2.5 | 2.5 |
| E modulus (GPa) (tensile test) | 3400 | 3440 | 3400 |
| Flexural strength (MPa) | 138 | 134 | 132 |
| E modulus (GPa) (bending test) | 3330 | 3350 | 3320 |
| Impact strength (kJ/m$^2$) | 18 | 16 | 16 |
| Barcol hardness | 48 | 48 | 45 |
| HDT (°C.) | 227 | 213 | 195 |

Post-curing cycle: 4 hours 40° C., 4 hours 80° C., 4 hours 120° C., 4 hours 160° C. and 4 hours 200° C.

EXAMPLE VIIA, B, C, D AND E

The effect of the isocyanate index on the mechanical properties of the cured product was examined using the solution from Example I. The procedure of example 3 was repeated, adding a) 135 g MDI (NCO/OH=0.83), b) 149 MDI (NCO/OH=0.91), c) 157 g MDI (NCO/OH=0.96), d) 164 g MDI (NCO/OH=1.00) and e) 175 g MDI (NCO/OH=1.06). The results are given in table 6.

TABLE 6

The effect of the isocyanate index on the mechanical properties

| | VIIa | VIIb | VIIc | VIId | VIIe |
|---|---|---|---|---|---|
| Tensile strength (MPa) | 70 | 73 | 70 | 73 | 70 |
| Elongation at break (%) | 2.6 | 2.8 | 2.6 | 2.8 | 2.6 |
| E modulus (GPa) (tensile test) | 3.6 | 3.4 | 3.5 | 3.5 | 3.4 |
| Flexural strength (MPa) | 131 | 138 | 130 | 125 | 127 |
| E modulus (GPa) (bending test) | 3.3 | 3.4 | 3.3 | 3.3 | 3.3 |
| Impact strength (kJ/m$^2$) | 9 | 13 | 15 | 11 | 14 |
| Barcol hardness | 48 | 48 | 48 | 48 | 48 |
| HDT (°C.) | 199 | 209 | 213 | 212 | 215 |

Post-curing cycle: 4 hours 40° C., 4 hours 80° C., 4 hours 120° C., 4 hours 160° C. and 4 hours 200° C.

What is claimed is:

1. A process for the manufacture of a cast, injection moulded or compression moulded article comprising; curing a resin composition in a desired shape using a catalyst; and
   post-curing the shaped article at temperatures between 120° and 250° C. such that an HDT of at least 150° C. is obtained;
   wherein the resin composition comprises an ethylenically unsaturated monomer, a vinyl ester compound and a polyisocyanate with at least 1.75 isocyanate groups per molecule on average, wherein said vinyl ester compound contains on average about 2 to about 6 (meth)acrylate groups and on average about two about 6 hydroxyl groups, and wherein said vinyl ester has a molecular weight higher than 300.

2. A process according to claim 1, wherein the curing takes place under such conditions that an HDT of 170° C. is achieved.

3. Process according to claim 1, characterized in that the curing takes place by post-curing the shaped cast, injection moulded or compression moulded article for such a time period and at such a temperature that the HDT of greater than 150° C. is achieved.

4. Process according to claim 1, wherein the vinyl ester has a molecular weight higher than 400.

5. Process according to claim 1, wherein the vinyl ester comprises at least about two groups of the formula

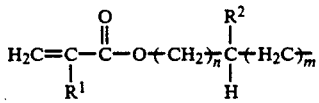 (I)

wherein

R$^1$ is selected from H or methyl, n and m are 0 or 1, n+m is 1 or 2; and wherein if n+m is 1, then R$^2$ is CH$_2$—OH, and if n+m is 2, then R$^2$ is OH.

6. A process as claimed in claim 1 wherein the ethylenically unsaturated monomer is selected from one or more vinyl esters, vinyl aromatic compounds, acrylates, methacrylates, vinyl ethers or vinyl nitriles.

7. A process as claimed in claim 6 wherein the ethylenically unsaturated monomer is styrene.

8. A process as claimed in claim 1 wherein the polyisocyanate is selected from one or more aliphatic, aromatic or cycloaliphatic polyisocyanates.

9. A process as claimed in claim 1 wherein the catalytic cure takes place at a temperature between 50° to 100° C.

10. A process as claimed in claim 1 wherein the catalyst is present in an amount of 0.5-5% by weight relative to the weight of the unsaturated components.

11. A process according to claim 1 wherein the average number of methacrylate groups and the average number of hydroxyl groups on the vinyl ester each independently is in the range 1.6 to 5.

12. A process as claimed in claim 11, wherein the average number of hydroxyl groups and the average number of methacrylate groups each independently is in the range 1.8-3.2.

13. A process as claimed in claim 1 wherein the molecular weight of the vinyl ester is in the range 300-5000.

14. A process as claimed in claim 13 wherein the molecular weight of the vinyl ester is in the range 400-2000.

* * * * *